Patented Feb. 22, 1944

2,342,572

UNITED STATES PATENT OFFICE 2,342,572

CRANKCASE LUBRICANT AND CHEMICAL COMPOUND THEREFOR

Elmer W. Cook, New York, N. Y., and William D. Thomas, Jr., Stamford, Conn., assignors to American Cyanamid Company, New York, N. Y., a corporation of Maine No Drawing. Application November 8, 1941, Serial No. 418,328

6 Claims. (Cl. 252—48)

This invention relates to a new class of chemical compounds which are useful as addition agents to lubricating oils of the type known as crankcase oils; i. e. hydrocarbon oils of relatively low viscosity and pour point such as are used in the crankcases of internal combustion engines and to lubricating oils of this type containing such additives. More particularly, the invention relates to the heavy metal salts of the p-tertiary amyl phenol diester of dithiophosphoric acid and to lubricating oils of the above type containing this class of compounds. By the term "heavy metal salts" in the following specification and claims we mean the salts of the metallic elements of groups II to VIII inclusive of the periodic system and specifically such salts as those of the alkaline earth metals magnesium, calcium, strontium and barium and other metals such as zinc, aluminum, chromium, tin, cobalt and nickel which form water-insoluble salts with di-(p-tertiary amyl phenyl) dithiophosphate. Salts of lithium, sodium, potassium, rubidium, and caesium, the alkali metals, are excluded from the invention.

The heavy metal salts of the diester of dithiophosphoric acid with p-tertiary amyl phenol are water-insoluble but hydrocarbon oil-soluble compounds. Most of the compounds of this class, including all the alkaline earth metal salts, are brown to light yellow solids of low melting points, rather difficultly soluble at elevated temperatures in hydrocarbon oils of the type of 10-W grade lubricating oil but capable of ready dispersion therein by the addition of dispersing agents of the type hereinafter described. However, these compounds can be dissolved in most lubricating oils to the extent of 0.1–3% by weight and we have found that when so dissolved or dispersed the resulting oils possess several remarkable and unexpected properties. The heavy metal salts of di-(p-tertiary amyl phenyl) dithiophosphate are detergents for the prevention of sludge deposits in truck, bus, aeroplane and marine gasoline and Diesel engines and they also possess many important non-oxidizing or anti-oxident properties when compared with other metal salt detergents that have previously been used. Moreover, these compounds are stable against excessive decomposilton and sludge formation under the conditions of heavy duty use in lubricating oil and therefore form only small amounts of sludge when the oil is used under high temperature conditions for long periods of time.

The p-tertiary amyl phenol diester of dithiophosphoric acid is prepared by reacting p-tertiary amyl phenol with phosphorous pentasulfide at 145–155° C. until evolution of hydrogen sulfide has stopped. The resulting ester is a brownish-yellow solid having a melting point of 83–85° C. and can be dissolved in a mixture of equal quantities of absolute alcohol and benzene solution and neutralized by heating the solution with a reactive heavy metal oxide. Heating of the mixture is then continued to complete the neutralization and a part of the solvent is evaporated to expel the water of neutralization whereupon the solution is filtered and the filtrate evaporated to recover the product. When an alkaline earth metal oxide such as barium oxide is used in this manner the alkaline earth metal salts so obtained have the following probable structural formula:

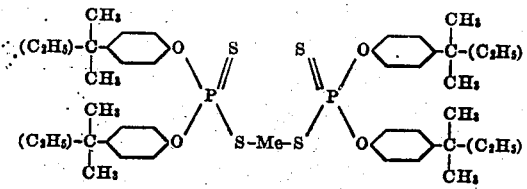

The corresponding salts of higher valency such as the aluminum and chromium salts have similar structural formulas in which three or more of the thiophosphoric acid ester radicals are linked through sulfur to the metal.

As is noted above one of the most important features of our invention resides in the addition to lubricating oils of the type of hydrocarbon crankcase oils of the heavy metal salts of the above-defined class, either alone or in admixture with other ingredients, in amounts sufficient to exert sludge-dispersing properties under heavy duty service conditions. The formation of sludge in crankcase oils is intimately related to the production of oxidation products of the type of organic acids and it is another important advantage of the heavy metal di-(p-tertiary amyl phenyl) dithiophosphates that they do not cause a substantial increase in oxygen absorption and consequent sludge formation in the oil.

As has been stated, the heavy metal salts of di-(p-tertiary amyl phenyl) dithiophosphates are not easily dissolved in lubricating oils and are soluble therein only to a limited extent. We have discovered, however, as another important feature of our invention, that these compounds are easily and permanently dispersed in lubricating oils with certain dispersing agents, notably the heavy metal salts of 2,4-diamyl phenol monosulfide described in our Patent No. 2,249,626 and the class of oil-soluble salts of sulfonated organic compounds. Representative examples of this latter class are the alkaline earth metal and other heavy metal salts of the esters of aliphatic sulfo-dicarboxylic acids, sulfotricarboxylic acids and other aliphatic sulfopolycarboxylic acids with alcohols containing 6 or more carbon atoms such as the dihexyl, dioctyl, and dilauryl sulfosuccinates and the corresponding triamyl sulfotricarballylates. Another important class of oil-soluble sulfonated organic compounds are the alkaline earth metal and other heavy metal salts of petroleum sulfonates described in our copending application Serial No. 419,016, filed November 13, 1941, and it is an important advantage of the invention that any of these compounds will both solubilize the heavy metal di-(p-tertiary amyl phenyl) dithiophosphates and assist in combating oxidation and decomposition in the lubricating oil when used in admixture therewith. These compounds of the class of heavy metal salts of diamyl phenol sulfide and oil-soluble sulfonated organic compounds may be used in amounts of 20% to 200% or more by weight of the amount of di-(p-tertiary amyl phenyl) dithiophosphate present in the oil.

The invention will be further illustrated in detail by the following specific examples, which present results obtained with a representative heavy metal salt of di-(p-tertiary amyl phenyl) dithiophosphate. It should be understood, however, that the invention in its broader aspects is not to be limited thereto.

*Example 1*

164 parts by weight of p-tertiary amyl phenol were mixed with 56 parts by weight of finely ground phosphorous pentasulfide and the mixture was heated with stirring to 145–155° C. and maintained at these temperatures for 2.5 hours. At the end of this time practically all of the phosphorous pentasulfide had disappeared and the evolution of hydrogen sulfide had stopped. Upon cooling the product was obtained as a yellow solid having a melting point of 83–85° C.

211 parts of the di-(p-tertiary amyl phenyl) dithiophosphoric acid ester so obtained were dissolved in a mixture of equal parts of ethyl alcohol and benzene by warming and 42 parts by weight of powdered commercial barium oxide were added. The mixture was brought to boiling with continued stirring and a part of the solvent was distilled off to remove water, after which traces of inorganic barium salts and other impurities were removed by filtration and the solvent was evaporated. The barium di-(p-tertiary amyl phenyl) dithiophosphate was obtained as a yellow solid of low melting point, practically insoluble in water but soluble in lubricating oils upon the application of heat.

The zinc and barium salts were prepared by a similar process, using equivalent quantities of zinc oxide and lead oxide. The salts of other heavy metals such as tin are preferably prepared by double decomposition between the sodium salt of the di-(p-tertiary amyl phenyl) dithiophosphoric acid ester, prepared by neutralization of the acid ester with sodium hydroxide, and a soluble inorganic salt of the heavy metal such as the nitrate.

*Example 2*

The barium di-(p-tertiary amyl phenyl) dithiophosphate was tested in representative lubricating oils by an accelerated oxidation test known as the Catalytic Indiana test. The testing apparatus consists of a constant temperature bath maintained at 341° F. in which a number of large glass test tubes are immersed. 300 cc. samples of the oil under test are poured into these tubes and air at the rate of 10 liters per hour is bubbled through the oil. In order to reproduce the conditions existing in the crankcase of an engine weighed strips of copper-lead alloy are suspended in the oil samples. As metallic surfaces, particularly copper, greatly accelerate the rate of oxidation and decomposition of the oil in the presence of oxygen this is an important factor in the test. Bearing corrosion rates can also be determined by again weighing the strips after 70 hours' immersion, which is the usual test period.

The results obtained by the above test procedure are shown in the following table, wherein oil A was a solvent extracted Pennsylvania oil of 10-W grade and oil B was a solvent refined Mid-Continent oil of 10-W grade.

|  | A. P. I. gravity oxidized oil | Naphtha insoluble, per cent | Bearing loss, mg. Cu-Pb | Neut. No. |
|---|---|---|---|---|
| Oil A | 23.5 | 17.47 | 215 | 4.83 |
| Oil A+0.3% Ba di-(p-tertiary amyl phenyl) dithiophosphate | 27.7 | 2.32 | +2 | 2.95 |
| Oil A+0.14% Ba di-(p-tertiary amyl phenyl) dithiophosphate + 0.45% Ba di-(2,4-diamyl phenol) monosulfide |  |  | 4 |  |
| Oil A+0.7% Ba di-(2,4-diamyl phenyl) monosulfide |  |  | 50 |  |
| Oil B |  |  | 328 |  |
| Oil B+0.4% Ba di-(p-tertiary amyl phenyl) dithiophosphate+0.2% Ba di-(2,4-diamyl phenol) monosulfide |  |  | 0 |  |
| Oil B+1.0% Ba di-(2,4-diamyl phenol) monosulfide |  |  | 46 |  |

The walls of the tubes which contained barium di-(p-tertiary amyl phenyl) dithiophosphate dissolved in the oil were much cleaner than those of the other tubes in the test and the small amount of deposit present was soft and easily dislodged. This fact indicates the action of the compound as a detergent in preventing sludge formation from the oil.

This application is a continuation-in-part of our copending application, Serial No. 401,960, filed July 11, 1941.

What we claim is:

1. A composition suitable for use as an improvement agent for hydrocarbon lubricating oils comprising a heavy metal salt of the p-tertiary-amyl phenol diester of dithiophosphoric acid and an oil-soluble dialkyl phenol sulfide heavy metal salt.

2. A composition suitable for use as an improvement agent for hydrocarbon lubricating oils comprising an alkaline earth metal salt of the p-tertiary-amyl phenol diester of dithiophosphoric acid and, an oil-soluble dialkyl phenol sulfide heavy metal salt.

3. A composition suitable for use as an improvement agent for hydrocarbon lubricating oils comprising the barium salt of the p-tertiary-amyl phenol diester of dithiophosphoric acid and an oil-soluble dialkyl phenol sulfide heavy metal salt.

4. A lubricating oil composition comprising crankcase oil having dispersed therein 0.1–3% of a heavy metal salt of the p-tertiary-amyl phenol diester of dithiophosphoric acid together with 20–200% of its weight of an oil-soluble dialkyl phenol sulfide heavy metal salt.

5. A lubricating oil composition comprising crankcase oil having dispersed therein 0.1–3% of an alkaline earth metal salt of the p-tertiary-amyl phenol diester of dithiophosphoric acid together with 20–200% of its weight of an oil-soluble dialkyl phenol sulfide heavy metal salt.

6. A lubricating oil composition comprising crankcase oil having dispersed therein 0.1–3% of the barium salt of the p-tertiary-amyl phenol diester of dithiophosphoric acid together with 20–200% of its weight of an oil-soluble dialkyl phenol sulfide heavy metal salt.

ELMER W. COOK.
WILLIAM D. THOMAS, Jr.